Figure 1:
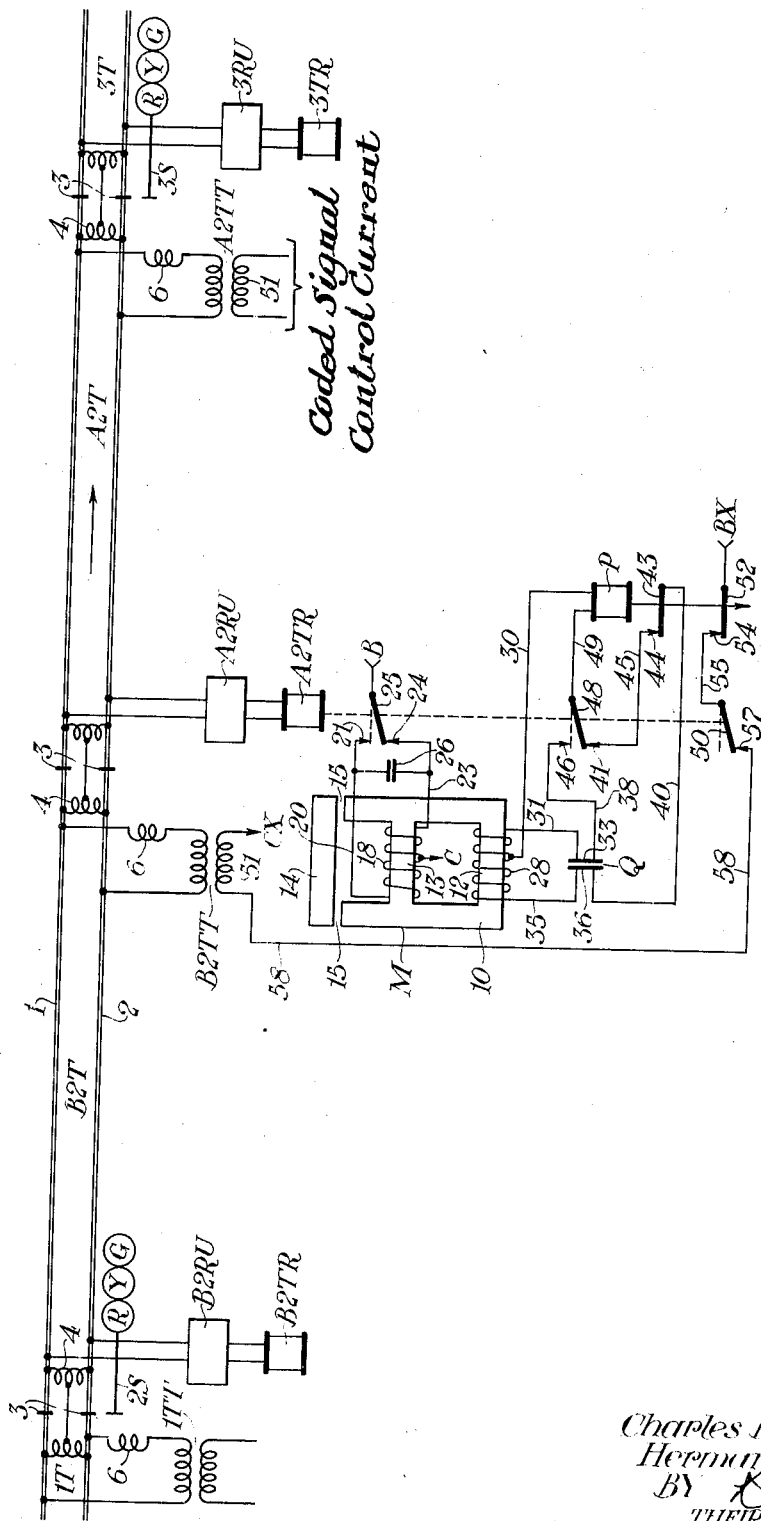

Aug. 13, 1940.    C. B. SHIELDS ET AL    2,211,174
RAILWAY TRAFFIC CONTROLLING APPARATUS
Filed May 23, 1939    2 Sheets-Sheet 1

INVENTORS
Charles B. Shields and
Herman G. Blosser
BY
THEIR ATTORNEY

Patented Aug. 13, 1940

2,211,174

UNITED STATES PATENT OFFICE 2,211,174

RAILWAY TRAFFIC CONTROLLING APPARATUS

Charles B. Shields, Penn Township, Allegheny County, and Herman G. Blosser, Pittsburgh, Pa., assignors to The Union Switch & Signal Company, Swissvale, Pa., a corporation of Pennsylvania Application May 23, 1939, Serial No. 275,146

11 Claims. (Cl. 246—34)

This invention relates to a coded railway signaling system, and particularly to improved means for preventing improper operation of the signaling system in the event an insulated joint separating adjacent track sections becomes defective.

In the design of signaling systems it is frequently desirable to divide the major blocks or track sections into two or more subsections, and to have means associated with the forward one of the adjacent subsections and operative on the supply of coded energy to such forward subsection to supply coded energy of the same code frequency to a rearward one of the subsections.

In such situations it is also frequently desirable to have the equipment associated with the forward subsection operate when the forward subsection is occupied to supply steady energy to the rearward subsection to discontinue operation of a highway crossing signal or for other purposes. In order to accomplish this supply of steady energy to the rearward subsection during occupancy of the forward subsection the track relay of the forward subsection must operate when its contacts are released to effect the supply of energy to the rearward subsection.

In addition, in order to prevent code distortion it is desirable that the track relay of the forward subsection, when following code, be operable to effect the supply of energy to the rearward subsection during the "off" periods of the code supplied to the forward subsection, that is during the released periods of the track relay contacts, or by means of a circuit which includes a back contact of the track relay of the forward subsection.

Where this back contact coding or energy supply is employed, if an insulated joint separating the forward and rearward subsections should become defective so that energy supplied to the rails of the rearward subsection feeds over the defective insulated joint and energizes the track relay of the forward subsection, the contacts of that track relay will become picked up and interrupt the supply of energy to the rearward subsection, thereby causing the track relay contacts to become released to again supply energy to the rearward subsection. This cycle of operation is repeated at a rapid rate so that energy is intermittently supplied to the rearward subsection, and the energy supplied as a result of this condition is known as "doorbell" code.

This "doorbell" code is objectionable as there is a possibility that it may cause the signal controlled by the track relay of the rearward subsection to display a less restrictive indication than it should display.

It is an object of this invention to provide means adapted for use at cut sections where back contact coding is employed to prevent generation of "doorbell" code.

A further object of this invention is to provide improved cut section facilities operable in the event of a defective insulated joint to supply steady energy to the section in the rear of the defective joint.

Another object of the invention is to provide means operative in the event of a defective insulated joint at a cut section to cut off the supply of energy to the section in the rear of the defective joint.

A further object of the invention is to provide means responsive to movement of the track relay contacts at the frequency effective to generate the "doorbell" code to remove control of the supply of energy to the rearward track section from the contacts of the track relay.

Another object of the invention is to provide improved cut section facilities including means responsive to code following operation of the track relay contacts, said means being operable when the track relay contacts are operated at the speeds normally employed for indication purposes to place the supply of current to the rearward track section under the control of a contact of the track relay, said means being also operable when the track relay contacts are operated at the speeds which produce "doorbell" code to remove control of the supply of energy to the rearward track section from the track relay contacts.

A further object of the invention is to provide improved cut section apparatus of the type described and which operates once it removes control of the supply of energy to the rearward track section from the track relay contact to restore control of the supply of energy to the rearward section to the track relay contact when said track relay contact responds to coded energy of the frequency employed for signaling purposes.

Other objects of the invention and features of novelty will be apparent from the following description taken in connection with the accompanying drawings.

We shall describe two forms of apparatus embodying our invention and shall then point out the novel features thereof in claims.

In the drawings, Fig. 1 is a diagram of a stretch of railway track equipped with signaling apparatus embodying this invention, this equipment being arranged so that in the event an insulated joint separating two subsections is defective no energy will be supplied to the rearward section.

Figure 2:
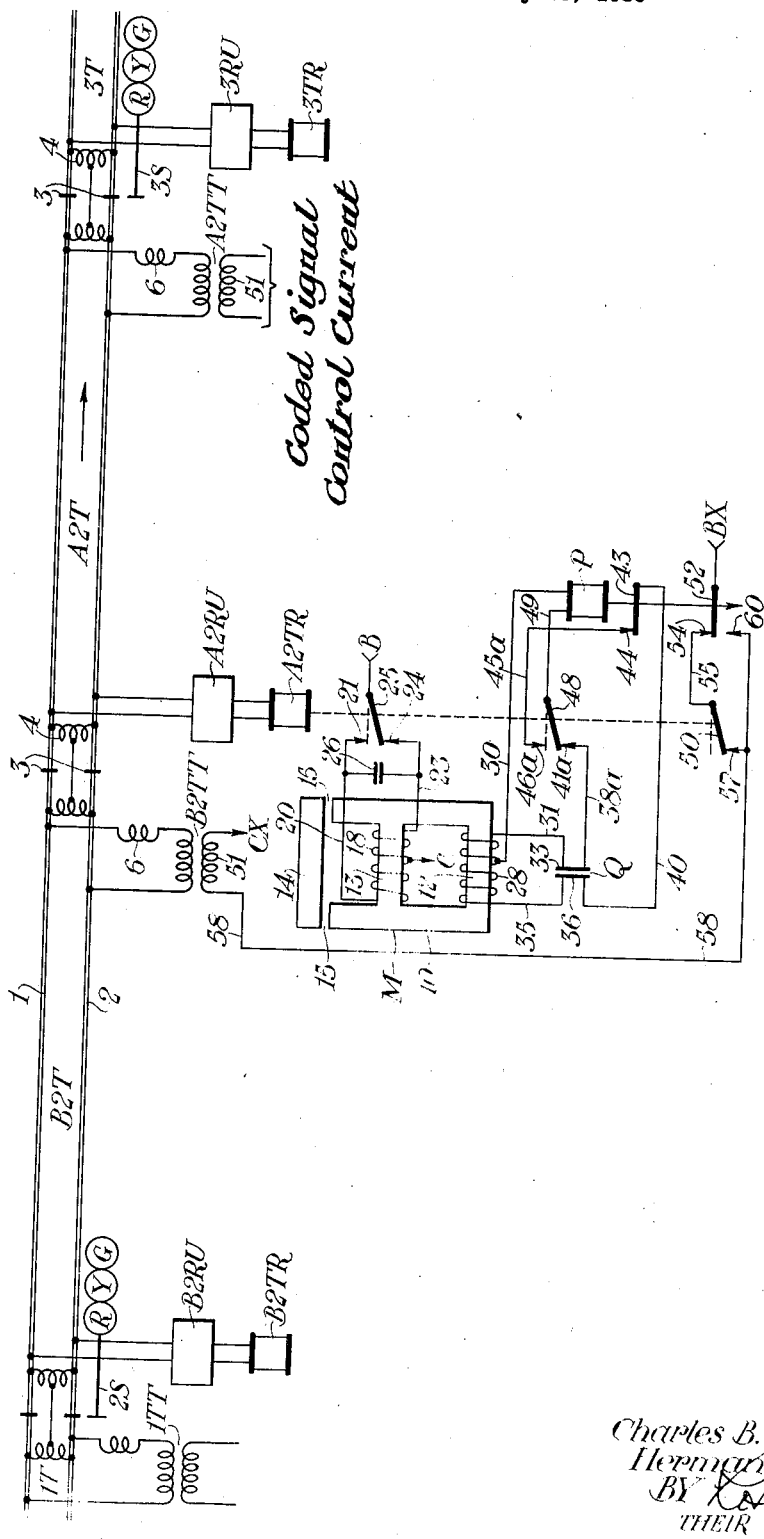

Fig. 2 is a diagrammatic view showing a modified form of apparatus embodying this invention, this equipment being arranged so that in the event an insulated joint separating two subsections is defective steady energy will be supplied to the rails of the rearward section.

*Construction of equipment shown in Fig. 1 of the drawings*

Referring to Fig. 1 of the drawings there is shown therein a stretch of railway track having track rails 1 and 2 over which traffic normally moves in the direction indicated by the arrow, that is, from left to right. Insulated rail joints 3 divide the track stretch into the customary successive block or track sections, while the block or track section between signals 2S and 3S is further divided into two subsections A2T and B2T.

The track stretch shown in Fig. 1 of the drawings is part of a railway system employing electric current for propulsion purposes, and for this reason alternating current energy is employed in the track circuits for signal control purposes, while impedance bonds 4 of the customary form are provided to conduct propulsion current around each pair of insulated rail joints.

As the description proceeds, however, it will become apparent that the apparatus of this invention is equally well suited for use on a steam road, in which application either direct current or alternating current may be employed in the track circuits for signal control purposes, while the impedance bonds 4 would, of course, be omitted.

Each of the main signal blocks has positioned at the entrance thereof a wayside signal which is adapted to indicate to an approaching train the nature of traffic conditions in the block section immediately ahead. The signals shown are of the well-known color-light type having three lenses designated G, Y and R, which when lighted direct rays of green, yellow and red light into the range of vision of the engineman of an approaching train. Two such signals are shown in Fig. 1 and are identified by the reference characters 2S and 3S.

While the invention has been illustrated and described in connection with a signal system employing wayside signals, it should be understood that the invention may also be employed in signal systems employing cab signals only.

The rails of each of the track sections form a part of a track circuit to which coded 100 cycle alternating current signal control current is normally supplied through a track transformer TT, the secondary winding of which is connected with the rails of the track section adjacent the exit end thereof, while a current limiting reactor 6 is included in the connection between one terminal of the transformer secondary winding and one of the track rails.

The 100 cycle alternating current signal control energy may be obtained from any suitable source and is distributed to the several locations in the track stretch by appropriate means as, for example, a transmission line, not shown. In the drawings the reference characters BX and CX designate the terminals of the source of signal control current.

In addition, each signal location and the apparatus at each cut section has associated therewith a source of direct current which may be a battery, not shown, the terminals of which are designated B and C.

The track stretch shown in Fig. 1 is equipped with a three-indication signaling system and makes use of track circuit energy coded or periodically interrupted at two different frequencies, such for example as 75 and 180 times per minute.

These codings are produced by code transmitters, not shown. These code transmitters are provided with contacts arranged to establish and interrupt a circuit for supplying energy to the track transformer of the adjacent section in the rear.

The track relay for each of the main signal blocks has associated therewith means responsive to code following operation of the track relay contacts, and selectively responsive to the rate of operation of such contacts, to condition the signal for that section to display its stop, caution or proceed indication, and to also determine at which of the two code frequencies energy is supplied to the adjacent track section in the rear.

The means associated with the track relays for controlling the signals and for controlling the supply of coded energy to the adjacent section in the rear is not a part of this invention, and any suitable means may be employed for this purpose. One form of apparatus which may be employed is shown in application Serial No. 210,743 of H. A. Thompson, filed May 28, 1938 for Railway traffic controlling apparatus, while another form of apparatus which may be employed is shown in application Serial No. 282,185, of Ralph R. Kemmerer, filed June 30, 1939, for Railway traffic controlling apparatus.

The track relays employed in the system shown in Fig. 1 are identified by the reference character TR together with a prefix corresponding to that of the track section with which the relay is associated. Each of the track relays is connected with the track rails of the associated track section throughout a resonant unit RU, which is arranged to pass the 100 cycle signal control energy, but not to pass the propulsion current.

This invention is directed principally to the equipment associated with the track relay A2TR which serves to supply to the rails of the section B2T current of the same code frequency that is supplied to the rails of section A2T.

The relay A2TR has associated therewith a reactive transformer M, a slow releasing auxiliary relay P, and a condenser Q.

The transformer M has a core 10 formed of suitable magnetic material, such as a plurality of laminations of silicon steel. The core 10 has three legs 12, 13 and 14, and is constructed in such a manner that the magnetic circuit including legs 12 and 13 is substantially complete without air gaps, while the magnetic circuit including legs 13 and 14 includes air gaps indicated at 15.

The transformer core leg 13 has mounted thereon primary winding 18, the center terminal of which is connected to terminal C of the local source of direct current. One end terminal of the primary winding 18 is connected by wire 20 to front contact 21 of track relay A2TR, while the other end terminal of the winding 18 is connected by wire 23 to back contact 24 of the track relay A2TR. The relay A2TR has a movable contact 25 which is connected to terminal B of the local source of direct current, while contact 25 when released engages contact 24 and when picked up engages contact 21. A condenser 26 is connected between wires 20 and 23 to minimize arcing at the contacts 21 and 24.

The core leg 12 has mounted thereon the transformer secondary winding 28 the center terminal of which is connected by wire 30 to one terminal of the winding of auxiliary relay P. One terminal of the transformer secondary winding 28 is connected by wire 31 to element 33 of the condenser Q, while the other end terminal of the transformer secondary winding 28 is connected by wire 35 to element 36 of the condenser Q.

The elements 33 and 36 of the condenser Q are electrically insulated from each other, while these elements are formed of suitable electrically conductive material, such as metal foil. The condenser is constructed in such manner that each of its elements has a terminal at each end thereof, and the wires 31 and 35 leading from the transformer secondary winding 28 are connected to terminals at one end of the condenser elements, while the terminals at the other end of the condenser elements have connected thereto wires 38 and 40 through which circuits are established from the condenser element to a terminal of the winding of relay P.

Wire 38 leads from condenser element 33 to front contact 46 of track relay A2TR, while wire 40 leads to contact 43 of relay P. Contact 43 when picked up engages contact 44 which is connected by wire 45 to back contact 41 of relay A2TR. The relay A2TR has a movable contact 48 which is connected by wire 49 to a terminal of the winding of relay P, while contact 48 when released engages contact 41 and when picked up engages contact 46.

The track relay A2TR has a contact 50 which controls the supply of energy to the primary winding 51 of track transformer B2TT, while contact 52 of relay P also controls the circuit of the primary winding of transformer B2TT. Contact 52 of relay P is constantly connected to terminal BX of the source of 100 cycle signal control energy, while contact 52 when picked up engages contact 54 which is connected by wire 55 to contact 50 of track relay A2TR. Contact 50 when released engages contact 57 which is connected by wire 58 to one terminal of primary winding 51 of track transformer B2TT, while the other terminal of the winding 51 is connected to terminal CX of the source of signal control energy.

*Operation of the equipment shown in Fig. 1*

The construction of the equipment shown in Fig. 1 having been described, its operation will now be explained. It will be assumed that the track stretch is unoccupied and that the equipment associated with the track relay 3TR is conditioned to supply coded energy of the 180 code frequency to the primary winding 51 of track transformer A2TT with the result that energy of this frequency is supplied to the track rails of section A2T. This energy will be supplied through the resonant unit A2RU to the winding of track relay A2TR, and the contacts of this track relay will be picked up during the "on" periods of the code and will be released during the "off" periods of the code.

During the "off" periods of the code, that is while the track relay contacts are in their released positions, a circuit is established by contact 25 of the track relay to energize the right-hand portion of the primary winding 18 of the transformer M, and when the track relay contacts are in their picked up positions contact 25 interrupts the circuit for energizing the right-hand portion of the transformer primary winding and establishes a circuit to energize the left-hand portion of the primary winding 18.

As a result of alternate energization of the two portions of the primary winding 18 flux of alternate relative polarity is created in the two magnetic circuits of which core leg 13 forms a part. One of these magnetic circuits includes core leg 12 on which the secondary winding 28 is mounted, while the other magnetic circuit includes core leg 14 and the air gaps 15.

As the core leg 12 has the secondary winding 28 mounted thereon changes in the flux in the magnetic circuit which includes the leg 12 will take place less rapidly than the changes in the magnetic circuit which includes core leg 14 and the air gaps 15. For example on establishment of the circuit in either portion of the primary winding 18 so that flux is created in the two magnetic circuits, flux will not build up materially in the circuit which includes core leg 12 until after the flux in the circuit including core leg 14 is built up substantially to the saturation point. There will be a similar delay in the decay of flux in the magnetic circuit including core leg 12 on interruption of the circuit of a portion of the primary winding 18. As changes in the flux of the magnetic circuit including core leg 12 are delayed there is a corresponding delay in the building up of current and also in the dying down of current in the secondary winding 28, and there is a phase displacement between the current in the transformer primary and secondary windings.

The track relay contact 48 is operated in synchronism with contact 25 and serves to rectify the current supplied from the transformer secondary winding 28 to the winding of relay P. Thus it will be seen that one terminal of the winding of relay P is constantly connected by wire 30 to the center terminal of the winding 28, while contact 48 when released establishes connection from one end terminal of the winding 28 to one terminal of the winding of relay P, this circuit being traced through wire 35, condenser element 36, wire 40, contacts 43—44 of the relay P, wire 45, contacts 41—48 of relay A2TR, and wire 49. This circuit is complete only when contact 43 of relay P is picked up.

Contact 25 of relay A2TR when picked up establishes a circuit from the other end terminal of the winding 28 to the terminal of the winding of relay P, this circuit being traced through wire 31, condenser element 33, wire 38, contacts 46—48 of relay A2TR, and wire 49.

From the foregoing it will be seen that when the track relay contacts are moved between their released and picked up positions contact 25 reverses the direction of energization of transformer primary winding 18, while contact 48 simultaneously transfers connection of the winding of relay P from one portion of the transformer secondary winding to the other so that if the relationship of the current in the transformer primary and secondary windings is such that these currents are substantially in phase, contact 48 will rectify the current supplied to the winding of relay P with the result that the current supplied to the relay winding will be of one relative polarity only, or will be predominantly of one polarity, so that the contacts of relay P will be maintained picked up. The relay P is of the slow releasing type so that its contacts will remain picked up between the supply of impulses of current to the relay winding.

However, when the phase displacement of the transformer secondary current with respect to the transformer primary current is increased to a predetermined degree, the contact 48 does not accurately rectify the current supplied to the secondary winding 28. Instead contact 48 is moved between its two positions while an impulse of current is being induced in the transformer secondary winding. During the first portion of the impulse, current of one relative polarity will be supplied to the winding of relay P, but on a change in the position of the contacts of the track relay A2TR, the supply of current of this relative polarity is cut off and a circuit is established to supply current of the opposite relative polarity to the relay winding. The supply of current of this relative polarity to the relay winding is continued for the remainder of this current impulse in the transformer secondary winding.

However, as soon as this impulse is completed there is a reversal of the polarity of the current induced in the transformer secondary winding so that there is another reversal in the polarity of the current supplied to the winding of the relay P. Similarly there is still further reversal in the direction of energization of the relay winding on the subsequent change in the position of the track relay contacts before completion of this current impulse in the transformer secondary winding.

As a result of these constant reversals in the direction of energization of the winding of relay P the contacts of the relay become released when the phase displacement between the current impulses in the transformer primary and secondary windings is such that the impulses of current supplied to the relay winding are not predominantly of one relative polarity.

This condition is not present when the contacts of the track relay are operated at those speeds at which they are operated when the relay winding is supplied with energy coded or interrupted at the rates supplied in the control of the signals, but this condition is reached when the track relay contacts are operated at rates substantially above the rates at which they are operated when responding to coded signal control energy. As will be explained in detail below, these higher rates of operation of the track relay contacts are present when an insulated joint is defective.

It will be seen also that the condenser Q is connected across the entire transformer secondary winding 28 while the condenser has a capacity relationship to the circuits for energizing the winding of relay P. The condenser Q absorbs a portion of the energy induced in the transformer secondary, thus reducing the value of the current available for energizing the winding of relay P. The condenser Q and the other parts of the apparatus are arranged and proportioned so that when the frequency of the current in the transformer secondary winding is of the value present when the track relay contacts are operated at the rate at which they are operated when following coded signal control energy, the value of the current remaining after the condenser has absorbed its quota is sufficient to maintain the contacts of the relay P picked up.

Similarly, the values of the condenser Q, the transformer winding, and the winding of relay P are also selected and proportioned so that when the track relay contacts are operated at a speed substantially higher than the speeds at which they are operated when the relay winding is energized with energy coded at the rates employed in the signaling system, the condenser Q will absorb such a large portion of the current supplied from the transformer secondary that too little current will be available to energize the winding of relay P to maintain the relay contacts picked up.

This reduction in the value of the current in the circuit of the winding of the relay P as a result of operation of condenser Q, coupled with the reduction in the effective value of the current supplied to the winding of relay P at high speeds of operation of the track relay contacts because of the imperfect rectification of the current supplied to the relay winding at that time, results in the release of the contacts of relay P.

As previously pointed out the track relay A2TR is assumed to be supplied with energy of the 180 code frequency so that the relay contacts are picked up and released at this rate. Accordingly the direction of energization of the primary winding 28 of the transformer M is reversed in accordance with speed of operation of the relay contacts, while relay contact 48 provides sufficiently perfect rectification of the current supplied to the winding of relay P to maintain the contacts of relay P picked up.

As contact 52 of relay P is picked up connection is established from terminal BX of the source of signal control current to the contact 50 of track relay A2TR. Accordingly, during the released periods of the track relay contact 50, at which time contact 50 engages contact 57, the circuit of the primary winding 51 of the track transformer B2TT is complete and this transformer supplies current to the rails of section B2T. When contact 50 becomes picked up it interrupts the circuit of the track transformer primary winding 51 and the supply of current to the rails of section 2T is interrupted. Since contact 50 is picked up and released in accordance with the frequency of the code impulses supplied to the rails of section A2T, contact 50 will operate to supply impulses of energy of the same code frequency to the rails of section B2T.

It is to be observed, however, that the code supplied to the rails of section B2T is inverted, that is, it is the reverse of the code supplied to section A2T since energy is supplied to the rails of section B2T during the "off" periods of the code in the section A2T, while the "off" periods in the code supplied to section B2T occur during the "on" periods of the code in section A2T.

On the supply of coded energy of the 180 code frequency to the relay B2TR the contacts of this relay are picked up and released in the usual manner, while the equipment associated with this relay operates in the well-known manner to condition the signal 2S to display its clear indication and energy of the 180 code frequency is supplied to the rails of section 1T.

On passage of a train through the track stretch from right to left the track relay B2TR is shunted as soon as the train enters the section B2T, and the equipment associated with the track relay is thereupon conditioned to cause a signal 2S to display its stop indication, while energy of the 75 code frequency is now supplied to the rails of section 1T.

As the train proceeds and enters section A2T it shunts the relay A2TR with the result that the contacts of this relay thereafter remain released.

As contact 25 remains released the direction of energization of the primary winding 18 of transformer M is not reversed and no current is induced in secondary winding 28, with the result that no current is supplied to the winding of relay P and the contacts of relay P thereupon become released.

On release of contact 52 of relay P the circuit for supplying current to the track transformer B2TT is interrupted and no current is supplied to the rails of section B2T so that the signal 2S continues to display its stop indication after the train vacates the section B2T.

When the train enters section 3T it shunts the track relay of that section with the result that signal 3S is conditioned to display its stop indication, while current of the 75 code frequency is supplied to track transformer A2TT and thus to the rails of section A2T.

However, the track relay A2TR continues to be shunted as long as any portion of the train remains in section A2T. When the rear of the train vacates section A2T the coded energy supplied to the rails of section A2T feeds to the track relay A2TR and effects code following operation of the track relay contacts in response to energy of the 75 code frequency.

On the first movement of the contacts of track relay A2TR from their released to their picked up positions the circuit for energizing the right-hand half of the transformer primary winding 18 is interrupted, and the circuit is established for energizing the left-hand portion of the transformer primary winding, while contact 48 engages contact 46 and establishes a circuit through which an impulse of current induced in secondary winding 28 is supplied to the winding of relay P.

The various parts of the apparatus are proportioned so that the impulse of current supplied to the winding of relay P at this time causes the contacts of the relay to become picked up.

On picking up of the contacts of relay P contact 43 engages contact 44 so that on the next released period of contact 48 of the track relay A2TR, as well as on all subsequent released periods of the track relay contacts, energy is supplied from the left-hand portion of the transformer secondary winding to the winding of relay P. This circuit is traced from one terminal of the secondary winding 28 through wire 35, condenser element 36, wire 40, contacts 43—44 of relay P, wire 45, contacts 41—48 of track relay A2TR, wire 49, winding of relay P, and wire 30 to the center tap of transformer secondary winding 28.

Accordingly once the contacts of relay P pick up the relay winding is supplied with impulses of energy both during the picked-up and released periods of the track relay contacts.

As pointed out above, as long as the contacts of relay A2TR are following energy coded at the frequencies employed in the signal system the energy supplied to the winding of relay P is of a value sufficient to maintain the contacts of the relay picked up.

As contact 52 of relay P is picked up energy is supplied to the track transformer B2TT during the released periods of the contacts of the track relay A2TR, while the supply of energy to the transformer is interrupted during the picked-up periods of the track relay contacts. Accordingly on picking up of the contacts of relay P the rails of section B2T are supplied with energy coded at the same frequency as that supplied to section A2T, in this case the 75 code frequency.

On the supply of energy of the 75 code frequency to the relay B2TR signal 2S is conditioned to display its yellow or caution indication, while energy of the 180 code frequency is supplied to the rails of section 1T.

When the train has advanced far enough in the track stretch to vacate the section 3T, the equipment associated with the track relay 3TR causes signal 3S to display its yellow or caution indication, while energy of the 180 code frequency is supplied to the rails of section A2T.

On the supply of current of the 180 code frequency to the rails of section A2T, and thus to the winding of track relay A2TR, the contacts of the track relay are operated at this higher frequency, and energy of this code frequency is supplied to the rails of section B2T.

On the supply of energy of the 180 code frequency to the track relay B2TR the signal 2S is conditioned to display its green or clear indication.

The normal operation of the equipment having been described, its operation in the event of failure of an insulated joint separating sections A2T and B2T will now be considered.

*Operation of system shown in Fig. 1 in event of defective insulated joint*

For purposes of illustration it will be assumed that one of the insulated joints 3 separating sections A2T and B2T becomes defective while the track stretch is unoccupied, at which time energy of the 180 code frequency is supplied to the rails of section A2T, and at which time the contacts of relay P are picked up.

The energy which is supplied to the rails of section B2T on the first released period of the contacts of track relay A2TR after the joint becomes defective feeds over the defective joint and energizes the winding of relay A2TR, thereby effecting picking up of the contact 50 of the track relay.

As soon as contact 50 is picked up it interrupts the supply of energy to the rails of section B2T, and therefore to the winding of relay A2TR, with the result that the contacts of the relay A2TR become released and current is again supplied to the rails of section B2T. As a result of this further supply of energy to the rails of section B2T, energy again feeds over the defective joint to the winding of relay A2TR, and again picks up the winding of relay A2TR, and again picks up the contacts of the relay. The contacts of the relay A2TR again interrupt the supply of energy to section B2T and to the winding of relay A2TR. This cycle of operation is repeated at a high frequency so that several movements of the track relay contacts away from their released positions may occur during one "off" period in the code supplied to the rails of section A2T.

On picking up of the contacts of track relay A2TR in response to energy feeding over the defective insulated joint contact 25 interrupts the circuit of the right-hand portion of the transformer primary winding 18 and establishes the circuit to energize the left-hand portion of the transformer primary winding, while the circuit for energizing the right hand portion of the transformer primary winding is reestablished on release of the contacts of the track relay.

As a result of this intermittent energization of the primary winding 18 current is induced in the transformer secondary winding 28. This current is of relatively high frequency, much higher than the frequency caused as a result of normal code following operation of the track relay contacts. The various parts of the equipment are selected and proportioned so that at this high frequency the current supplied to the winding of relay P is ineffective to maintain the contacts of the relay P picked up. Accordingly the contacts of relay P become released and contact 52 interrupts the supply of energy to the track transformer B2TT.

As pointed out in detail above the reduction in the effective value of the current supplied to the winding of relay P is a result of the action of the condenser Q, and of the imperfect rectification of the transformer secondary output by the contact 48 at high rates of operation of the track relay contacts.

As a result of the supply of coded energy to the rails of section A2T by the transformer A2TT, a pulse of energy will be supplied to the winding of relay A2TR and will effect picking up of the contacts of the relay. On picking up of the relay contacts, contact 25 interrupts energization of one portion of the primary winding 18 and establishes a circuit to energize the other portion of the transformer primary winding, and as a result of this change in the energization of the primary winding current is induced in the secondary winding.

At this time contact 48 is picked up and engages contact 46 to establish the circuit to supply energy from the right-hand portion of the transformer secondary winding 28 to the winding of relay P with the result that the contacts of relay P become picked up.

On picking up of contact 52 a circuit is established from terminal BX of the source of signal control current to contact 50 of track relay A2TR, but at this time the track relay contact is picked up and does not establish a circuit to supply energy to the primary winding 51 of the track transformer B2TT.

At the end of the "on" period of the code supplied by transformer A2TT to the rails of section A2T the contacts of the track relay A2TR become released and there is a change in the direction of energization of the primary winding 18 of transformer M, while contact 48 engages contact 41 and establishes the circuit to supply energy from the left-hand portion of the secondary winding 28 to the winding of relay P. This circuit is complete at this time since contact 43 of relay P is picked up.

On release of the track relay contacts, contact 50 engages contact 57, and, as contact 52 of relay P is picked up, the circuit is now complete to supply energy to the winding 51 of transformer B2TT.

On the supply of energy to the primary winding of transformer B2TT this transformer supplies energy to the rails of section B2T, and this energy feeds over the defective joint to energize the winding of track relay A2TR with the result that contact 50 of the relay becomes picked up to interrupt the supply of energy to the transformer B2TT, and accordingly to the winding of the track relay A2TR. The track relay contacts will thereupon become released to again effect the supply of energy to the transformer B2TT and the track relay contacts will be rapidly picked up and released as explained above. On this supply of energy at the high or "doorbell" code frequency the contacts of relay P become released to cut off the further supply of energy to the transformer B2TT during the balance of this "off" period in the code supplied to the rails of section A2T.

On the next "on" period of the code supplied by transformer A2TT to the rails of section A2T the contacts of track relay A2TR become picked up and energy is supplied to the winding of relay P, as explained above, to effect picking up of the contacts of that relay, while this cycle of operation is continued as long as coded energy continues to be supplied to the rails of section A2T.

As a result of this mode of operation of the equipment associated with the track relay A2TR, during the "on" periods of the code supplied to the section A2T the contacts of the track relay A2TR are picked up and no energy is supplied to the rails of section B2T. During the "off" periods of the code supplied to the rails of section A2T, one or two or more impulses of energy will be supplied to rails of section B2, the frequency of the impulses of energy being the "doorbell" code frequency. After these few impulses the contacts of the relay P become released and prevent the further supply of energy to the rails of section B2T during the balance of this "off" period in the code supplied to section B2T.

As a result of the supply of these periodic impulses of energy to the rails of section B2T the contacts of the relay B2TR may be picked up and released, and the signal 2S will be conditioned to display a proceed indication. This is proper since the section in advance of signal 2S is unoccupied.

It has been found that where the equipment provided by this invention is employed at a cut section the signal 2S will not display a less restrictive indication than it would display if the insulated joint separating the sections A2T and B2T were not defective and the relay A2TR operated in the usual manner to supply code of the same type to section B2T that it supplied to section A2T.

*Operation of the equipment shown in Fig. 1 if an insulated joint breaks down as the result of passage of a train*

When a train is present in sections B2T and A2T the track relay A2TR is shunted and the relay P is deenergized so that its contact 52 is released and interrupts the supply of energy to the track transformer B2TT. In addition at this time the relay B2TR is shunted and conditions the signal 2S to display its red or stop indication.

When the train has advanced far enough in the track section to vacate section B2T the relay B2TR is no longer shunted, but relay A2TR is shunted and relay P remains released so that no energy is supplied to section B2T and the contacts of relay B2TR remain released.

As no energy is supplied to the rails of section B2T as long as relay A2TR is shunted, there is no possibility that energy supplied to the rails of section B2T will feed over the defective joint and energize the winding of relay A2TR and cause the relay A2TR to generate the "doorbell" code described above.

If the equipment were arranged so that at this time energy were supplied to the rails of section B2T it would feed over the defective joint, and, after the train had advanced far enough in the track section A2T to no longer be effective to shunt the relay A2TR with respect to energy supplied over the defective joint from section B2T, this energy feeding over the defective joint would cause the track relay A2TR to supply energy of the "doorbell" code frequency to the rails of section B2T.

Current of this code frequency, when supplied to the relay B2TR, will cause code following operation of the contacts of that relay, while the equipment associated with the relay B2TR will condition the signal 2S to display its caution or yellow aspect, thereby indicating to an approaching train that the block section in advance of signal 2S is not occupied when in fact it is occupied.

This condition is particularly objectionable if the first train were to stop with the rear end thereof located adjacent the forward end of section A2T, in which event signal 2S would display its caution indication as long as the train remained at that point, and a following train would receive from signal 2S incorrect information with respect to the condition of track occupancy in advance.

Since with the equipment provided by this invention after the track relay A2TR is deenergized for a brief time interval, such as is caused when a train enters the section A2T, the relay P is deenergized and cuts off the supply of energy to the section B2T, there is no possibility that the objectionable "doorbell" code will be generated if an insulated joint separating sections A2T and B2T is defective.

When the train has advanced far enough in the track stretch so that the rear of the train vacates section A2T, energy of the 75 code frequency supplied by the equipment associated with track relay 3TR to the rails of section A2T feeds to the winding of relay A2TR and the contacts of this relay are picked up and released in accordance with the code impulses. During the "on" periods of the code energy is supplied to the winding of relay P and during the "off" periods of the code energy is supplied to the rails of section B2T and this energy feeds over the defective joint to energize the relay A2TR with the result that during each "off" period in the code this relay supplies a limited number of impulses of energy of the "doorbell" code frequency to section B2T, as explained above, after which the contacts of the relay P become released to prevent the further supply of current to the section B2T during the balance of the "off" period in the code supplied to the rails of section A2T.

This mode of operation is continued as long as coded energy is supplied to the rails of section A2T. When the train has advanced far enough in the track stretch to vacate section 3T the energy supplied to the section A2T is changed from 75 to 180 code frequency, while the track relay A2TR continues to operate as described above to supply impulses of energy of the "doorbell" code frequency to the rails of section B2T.

As a result of the supply of these impulses of energy to the rails of section B2T, the relay B2TR will be operated and the signal 2S will be conditioned to display one of its proceed indications. This is proper, however, as the block section in advance of signal 2S is unoccupied at this time.

From the foregoing it will be seen that the system provided by this invention and shown in Fig. 1 of the drawings operates in the event that an insulated joint separating two cut sections is defective to prevent the supply of energy to the rearward section as long as the forward section is occupied. As a result, "doorbell" code cannot be generated at such times, and there is no possibility that the signal at the entrance to the rearward cut section will display a proceed indication when it should not do so, that is, as long as the block section in advance of that signal is occupied.

Construction of equipment shown in Fig. 2 of the drawings

The equipment shown in Fig. 2 of the drawings is the same as that shown in Fig. 1 except as hereinafter specially pointed out in detail. The system shown in Fig. 2 of the drawings differs in operation from that shown in Fig. 1 in that in the system shown in Fig. 2 when the forward one of adjacent subsections is occupied steady energy is supplied to the rearward one of the subsections and this supply of steady energy is continued thereafter if an insulated joint separating the two cut sections is defective.

In the system shown in Fig. 2 the equipment associated with the track relay A2TR is the same as that associated with the track relay A2TR shown in Fig. 1 of the drawings, except for the connections from the transformer secondary winding 28 to the winding of the relay P, and except for the circuit for supplying energy to the winding 51 of the transformer B2TT.

In the system shown in Fig. 1 of the drawings the track relay contact 48 when picked up establishes a circuit to energize the winding of relay P regardless of whether or not the contacts of relay P are picked up, while the system shown in Fig. 2 is arranged so that the track relay contact 48 when picked up establishes a circuit to energize the winding of relay P only if the contacts of relay P are picked up.

Another difference between the systems shown in Fig. 1 and Fig. 2 is the fact that in the system shown in Fig. 1 when the contacts of relay A2TR are steadily released no current is supplied to the primary winding of transformer B2TT, while in the system shown in Fig. 2 when the contacts of the relay P are steadily released steady or uncoded energy is supplied to the primary winding of transformer B2TT.
Referring to Fig. 2 of the drawings condenser element 33 is connected by wire 38a to back contact 41a of the track relay A2TR, while condenser element 36 is connected by wire 40 to contact 43 of relay P. Contact 43 when picked up engages contact 44 which is connected by wire 45a to front contact 46a of the track relay A2TR.

In the system shown in Fig. 2 the wire 58 leading from one terminal of the primary winding 51 of track transformer B2TT is connected not only to contact 57 of the track relay A2TR, but also to back contact 60 of relay P. The contact 52 of relay P when released engages contact 60.

The system shown in Fig. 2 is otherwise the same as that shown in Fig. 1 of the drawings.

Operation of the system shown in Fig. 2 of the drawings

Under normal conditions with the track stretch unoccupied the system shown in Fig. 2 operates in substantially the same manner as the system shown in Fig. 1. At such times energy of the 180 code frequency is supplied to the rails of section A2T and the contacts of relay A2TR are picked up and released at this frequency. As a result of operation of the contacts of track relay A2TR the direction of energization of the primary winding 18 of transformer M is periodically reversed and current is induced in transformer secondary winding 28, while the contact 48 of the track relay rectifies the current supplied to the winding of relay P with the result that the contacts of relay P are maintained picked up.

As contact 52 of relay P is picked up the circuit for supplying steady uncoded energy to transformer primary winding 51 is interrupted, while connection is established from terminal BX of the source of signal control energy to contact 50 of the track relay A2TR. Accordingly during the released periods of the contacts of the track relay A2TR contact 58 establishes the circuit to energize the transformer primary winding 51, while this circuit is interrupted during the picked-up periods of the track relay contacts with the result that energy of the same code frequency is supplied to the rails of section B2T as is supplied to the rails of section A2T.

Since energy of the 180 code frequency is supplied to the rails of section B2T, and thereby to the winding of track relay B2TR, the equipment associated with the relay B2TR conditions the signal 2S to display its green or clear aspect, while energy of the 180 code frequency is supplied to the rails of section 1T.

On passage of a train through the track stretch in the normal direction of traffic, that is, from left to right, the relay B2TR will be shunted as soon as the train enters section B2T, and the signal 2S will thereupon be conditioned to display its red or stop indication, while energy of the 75 code frequency will now be supplied to the rails of section 1T.

When the train has proceeded far enough in the track stretch to enter section A2T the track relay A2TR is shunted and its contacts remain in their released position, and energy is no longer supplied to the winding of relay P and the contacts of relay P thereupon become released.

On release of contact 52 of relay P it engages contact 60 to establish a steady energy supply circuit to supply energy to primary winding 51 of track transformer B2TT, and as a result steady or uncoded energy is supplied by the transformer B2TT to the rails of section B2T. At this time, however, since a portion of the train is present in section B2T the track relay B2TR is shunted and its contacts do not become picked up.

When the train has proceeded farther in the track stretch so that the rear of the train vacates section B2T, the steady energy supplied to the rails of section B2T by track transformer B2TT feeds to the winding of relay B2TR and the contacts of this relay become picked up and thereafter remain in their picked-up position. As a result of picking up of these contacts of the track relay B2TR no change is made in the aspect of signal 2S and this signal continues to display its red or stop aspect, while energy of the 75 code frequency continues to be supplied to the rails of section 1TT.

As a result of picking up of contacts of track relay B2TR a circuit, not shown, may be established to discontinue operation of a highway traffic signal, not shown, in the manner described in detail in the Thompson and Kemmerer applications referred to above.

When the train has proceeded far enough so that it enters section 3T the track relay 3TR is shunted and the signal 3S is conditioned to display its stop indication, while energy of the 75 code frequency is now supplied to the rails of section A2T. However, as long as a portion of the train is present in section A2T the relay A2TR continues to be shunted.

When the train has proceeded far enough so that the rear of the train clears section A2T the energy of 75 code frequency supplied to the rails of section A2T feeds to the winding of track relay A2TR and the contacts of this relay are picked up and released in accordance with the supply of energy to the relay winding.

As a result of picking up and releasing of contact 25 the direction of energization of primary winding 18 is periodically reversed and current is induced in the secondary winding 28 of transformer M. On the first picked-up period of track relay contact 48 it engages contact 46a, but, since at this time contact 43 of relay P is released, no circuit is established to supply energy from the transformer secondary winding 28 to the winding of relay P. Accordingly the contacts of relay P remain released.

On the first released period of the contact 48 following its first picked-up period contact 48 engages contact 41a and establishes a circuit to supply energy from the right-hand portion of the transformer secondary winding 28 to the winding of relay P. This circuit is complete at this time and is traced from one terminal of the transformer secondary winding 28 through wire 31, condenser element 33, wire 38a, contacts 41a—48 of relay A2TR, wire 49, winding of relay P and wire 30 to the center terminal of the winding 28.

The various parts of the apparatus are selected and proportioned so that on the supply of an impulse of current to the winding of relay P as a result of this movement of the track relay contact 48 to its released position the contacts of relay P will become picked up. On picking up of contact 43 of relay P it engages contact 44 so that on the subsequent picked-up periods of the track relay contact 48 the circuit is established to energize the winding of relay P. Accordingly the winding of relay P will be supplied with impulses of current from the transformer secondary winding 28 during the picked-up periods of the track relay contacts as well as during the released periods of the track relay contacts once the contacts of relay P become picked up.

On picking up of contact 52 of relay P it interrupts the steady energy supply circuit for the primary winding 51 of track transformer B2TT, while contact 52 engages contact 54 to establish connection from terminal BX of the source of signal control energy to contact 50 of the track relay. Accordingly during the released periods of contact 50 of the track relay energy will be supplied to the primary winding 51 of track transformer B2TT while the supply of energy will be interrupted during the picked-up periods of the track relay contact 50.

Since at this time the contacts of track relay A2TR are picked up and released in accordance with the supply of energy of the 75 code frequency, this code frequency will be repeated in the energy supplied to the rails of section B2T and the contacts of track relay B2TR will be operated at this frequency. As a result the signal 2S will be conditioned to display its yellow or caution signal, while energy of the 180 code frequency will be supplied to the rails of section 1T.

When the train has proceeded far enough in the track stretch to vacate section 3T the equipment associated with relay 3TR is conditioned to cause the signal 3S to display its yellow or caution signal, while the supply of energy to the rails of section A2T is changed from the 75 code frequency to the 180 code frequency.

On this change in the frequency of the coded energy supplied to the rails of section A2T there is change in the rate of operation of the contacts of relay A2TR, and a corresponding change in the frequency of the code supplied to the rails of section B2T. On the supply of 180 code to the rails of section B2T, the track relay B2TR conditions the signal 2S to display its green or clear signal, while the supply of energy of 180 code frequency is continued to section IT.

*Operation of the equipment shown in Fig. 2 in event of a defective insulated joint*

For purposes of illustration it will be assumed that an insulated joint separating sections B2T and A2T becomes defective as the result of passage of a train.

As explained above when a train passes from section B2T to section A2T the track relay A2TR is shunted and the contacts of relay P become released so that contact 52 establishes the circuit to supply steady energy to the primary winding of track transformer B2TT.

As long as any portion of the train is in section B2T the track relay B2TR is shunted, but when the rear of the train vacates section B2T the contacts of relay B2TR become picked up and are held picked up by the steady energy supplied to the rails of section B2T, while the signal 2S continues to display its red or stop aspect.

When the train advances in the track stretch far enough so that the rear of the train is located a substantial distance in advance of the track relay A2TR the train is no longer effective to shunt the relay with respect to current supplied from section B2T, and the current feeding over the defective joint energizes the relay A2TR so that the contacts of the relay become picked up.

At this time contact 52 of relay P is released and, therefore, picking up of contact 50 does not interrupt the supply of steady energy to the rails of section B2T.

As a result of movement of the contact 25 of relay A2TR from its released to its picked-up position there is a change in the direction of energization of the primary winding 18 of transformer M and current is induced in the transformer secondary winding 28.

On movement of contact 48 of relay A2TR from its released to its picked-up position the contact engages contact 46a, but at this time contact 43 of relay P is released so that on picking up of contact 48 no circuit is established to supply energy from the transformer secondary winding 28 to the winding of relay P. Accordingly, the contacts of relay P remain released and contact 52 maintains the circuit for supplying steady energy to the primary winding 51 of transformer B2TT.

Since the supply of steady energy to the rails of section B2TT is maintained after picking up of the contacts of relay A2TR, the steady energy feeding over the defective joint will continue to energize the winding of relay A2TR and maintain the contacts of the track relay picked up.

At this time, as steady energy continues to be supplied to the rails of section B2T, the contacts of relay B2TR are maintained picked up and the signal 2S is conditioned to continue to display its red or stop signal.

As the train continues through the track stretch and the rear of the train vacates the section A2T, energy of the 75 code frequency supplied by the equipment associated with track relay 3TR to the rails of section A2T feeds to the relay A2TR. At this time, however, the steady energy feeding over the defective insulated joint from section B2T fills in the "off" periods in the code supplied by track transformer A2TT, and hence the contacts of relay A2TR will not follow the energy of 75 code frequency supplied through transformer A2TT. Instead the contacts of relay A2TR will be maintained picked up, while contact 52 of relay P will remain released and steady uncoded energy will continue to be supplied to the rails of section B2T. Accordingly relay B2TR will be steadily energized and signal 2S will continue to display its stop indication.

This same condition will continue when the train has advanced far enough to vacate section 3T so that energy of 180 code frequency is supplied by transformer A2TT to the rails of section A2T.

From the foregoing it will be seen that the apparatus shown in Fig. 2 is arranged so that in the event an insulated joint becomes defective as the result of passage of a train steady energy will be supplied to the rearward one of the two cut sections, and will thereafter be continued even after the train vacates the forward one of the cut sections.

This equipment is also arranged so that if for any reason the steady energy supply circuit is temporarily interrupted it will be automatically reestablished.

If for any reason the supply of steady energy to section B2T is interrupted, or if feeding of steady energy over the defective insulated joint is temporarily interrupted, the contacts of relay A2TR will become released during the "off" periods of the code supplied to the rails of section A2T by transformer A2TT.

On movement of the contacts of relay A2TR to their released position there is a reversal in the direction of energization of primary winding 18 of transformer M, while current is induced in the secondary winding 28. On release of contact 48 it engages back contact 41a and establishes a circuit to supply an impulse of current from the transformer secondary winding 28 to the winding of relay P. As explained above, on the supply of such an impulse of current the contacts of relay P become picked up and contact 43 engages contact 44 so that on the next picked-up period of the track relay contact 48 another impulse of current is supplied to the winding of relay P.

On picking up of contact 52 of relay P the circuit for supplying steady energy to the transformer B2TT is interrupted, while connection is established from terminal BX of the source of signal control energy to contact 50 of track relay A2TR. The contact 52 of relay P becomes picked up at a time when contact 50 of relay A2TR is released so the supply of energy to the transformer B2TT is not interrupted immediately upon picking up of contact 52 of relay P. However, on the next picked-up period of contact 50 of relay A2TR the supply of energy to transformer B2TT is interrupted and thereafter energy is supplied to the rails of section B2T only during the released periods of the track relay contact 50. Accordingly, energy of the same code frequency is supplied to the rails of section B2T as is supplied to the rails of section A2T, but the impulses of energy to the rails of B2T occur during the "off" periods of the code supplied to the rails of section A2T.

On the supply of coded energy to the relay B2TR the contacts of that relay follow code in the usual manner and condition the signal 2S to display a proceed indication, the particular one depending upon the frequency of the code supplied to the relay.

The track relay A2TR will continue to follow the code supplied to section A2T by transformer A2TT as long as energy does not feed over the defective joint from section B2T, or feeds over the defective joint in such limited amounts as to be ineffective to maintain the contacts of relay A2TR picked up during the "off" periods of the code supplied to the rails of section A2T.

As soon as energy begins to feed over the defective joint in substantial amounts, the impulses of energy supplied to section B2T, since they come during the "off" periods of the code supplied to the rails of section A2T, will energize the winding of relay A2TR and cause the contacts of the relay to become picked up. On picking up of contact 50 of relay A2TR the circuit for supplying energy to the rails of section B2T is interrupted and energy does not feed over the defective insulated joint to the relay A2TR. Accordingly the contacts of relay A2TR become released and contact 50 again engages contact 51 to effect the supply of energy to the rails of section B2T. On the supply of energy to section B2T current feeds over the defective joint and energizes relay A2TR so that the relay contacts are again picked up. This cycle of operation is repeated very rapidly and the frequency of the current induced in the secondary winding 28 of transformer M is such that the current supplied to the winding of relay P is ineffective to maintain the relay contacts picked up, as explained in detail above in connection with the system shown in Fig. 1 of the drawings.

On release of the contacts of relay P contact 52 engages contact 69 and establishes the circuit to supply steady energy to the transformer B2TT which steady energy is thereafter supplied to the rails of section B2T and feeds over the defective joint and energizes the winding of relay A2TR with the result that the contacts of relay A2TR are thereafter constantly picked up.

On movement of the contacts of relay A2TR to their picked-up position following release of the contacts of relay P no energy is supplied to the winding of relay P since contact 43 of relay P is released and interrupts the circuit of the winding of relay P. Accordingly the contacts of relay P do not become picked up and as a result of movement of the contacts of relay A2TR to their picked-up position on the supply of steady energy to the relay A2TR, while when the contacts of relay A2TR are constantly picked up no energy is supplied through the transformer M to the winding of relay P and the contacts of relay P remain released and maintain the circuit for supplying steady energy to the rails of section B2T.

As a result of the supply of steady energy to the rails of section B2T the signal 2S is conditioned to display its stop indication.

It will be seen that when the contact 52 of relay P is released and establishes the circuit to supply steady energy to the rails of section B2T, the circuit controlled by the track relay contact 50 for supplying energy to the rails of section B2T is interrupted. This prevents operation of the track relay contacts to generate the "doorbell" code in the event the steady energy supply circuit is interrupted.

With the arrangement shown in Fig. 2, when contact 52 of relay P is released to establish the steady energy supply circuit, the connection from terminal BX to the track relay contact 50 is interrupted. If at this time the steady energy supply circuit is interrupted, as might occur if the wire leading from terminal BX to contact 52 were broken or should become disconnected, the supply of steady energy to the rails of section B2T will be discontinued and the contacts of relay A2TR will become released. Release of contact 50, however, does not establish a circuit to supply energy to the rails of section B2T, and the contacts of relay A2TR remain released until relay A2TR is supplied with energy by some means other than the circuit controlled by the track relay contact 50, as for example coded energy supplied through track transformer A2TT.

Since energy is not supplied to the rails of section B2T on the release of contact 50 of relay A2TR there is no possibility that the relay A2TR will operate to generate "doorbell" code.

If at this time the contact 52 did not interrupt the connection from terminal BX of the source of current to track relay contact 50, that is, if connection were established directly from terminal BX of the source of current to track relay contact 50, then on failure of the steady energy supply circuit, and release of the track relay contact 50, energy would be supplied to the rails of section B2T and would feed over the defective joint and energize relay A2TR so that the relay contacts would be picked up and interrupt the supply of energy to the rails of section B2T, whereupon the relay contacts would become released, and the cycle of operation would be repeated so that energy of the "doorbell" code frequently would be supplied to the rails of section B2T, and the signal 2S might be caused to display a less restrictive indication than it should.

As pointed out above, however, the system shown in Fig. 2 is arranged so that when the steady energy supply circuit is established, the circuit of the track relay contact is interrupted, and hence if the steady energy supply circuit is broken for any reason the track relay contact cannot affect the supply of current to the rearward section, and there is no possibility that "doorbell" code will be generated under these conditions.

The equipment operates in a manner similar to that described above if an insulated joint becomes defective at a time when the track stretch is unoccupied.

In such an event during the first "off" period in the code supplied to the rails of section A2T after the joint becomes defective the track relay A2TR operates, as explained in detail above, to supply a few impulses of energy of the "doorbell" code frequency to the rails of section B2T, after which the contacts of relay P become released and steady energy is supplied to the rails of section B2T. Thereafter the contacts of relay A2TR are held constantly picked up.

Although we have herein shown and described only two forms of the improved railway traffic controlling apparatus embodying our invention, it is understood that various changes and modifications may be made therein within the scope of the appended claims without departing from the spirit and scope of our invention.

Having thus described our invention, what we claim is:

1. In a coded railway signaling system, in combination, a stretch of railway track having a pair of track rails divided by insulated joints into a plurality of successive sections and including a forward and a rearward section, means governed by traffic conditions in advance of said forward section for selectively supplying to the rails of said forward section energy periodically interrupted at predetermined frequencies, each of said sections having a code following track relay receiving energy from the rails of such section, a circuit through which current may be supplied to the rails of the rearward section, said circuit including a contact of the track relay of the forward section and being complete only when said relay contact is in its released position, whereby if energy supplied over said circuit feeds to the winding of the track relay for the forward section said circuit becomes interrupted on picking up of the contacts of said relay with the result that the relay contacts become released to reestablish said circuit with resultant picking up and releasing of the track relay contacts at rates substantially more rapid than the rates at which said relay contacts are picked up and released when the relay is supplied with energy periodically interrupted at said predetermined frequencies, and means responsive to and operative on picking up and releasing of the contacts of the track relay of the forward section at said substantially more rapid rates to remove control of the supply of energy to the rearward track section from the circuit controlled by said track relay contact.

2. In a coded railway signaling system, in combination, a stretch of railway track having a pair of track rails divided by insulated joints into a plurality of successive sections and including a forward and a rearward section, means governed by traffic conditions in advance of said forward section for selectively supplying to the rails of said forward section energy periodically interrupted at predetermined frequencies, each of said sections having a code following track relay receiving energy from the rails of such section, a circuit through which current may be supplied to the rails of the rearward section, said circuit including a contact of the track relay of the forward section and being complete only when said relay contact is in its released position, whereby if energy supplied over said circuit feeds to the winding of the track relay for the forward section said circuit becomes interrupted on picking up of the contacts of said relay with the result that the relay contacts become released to reestablish said circuit with resultant picking up and releasing of the track relay contacts at rates substantially more rapid than the rates at which said relay contacts are picked up and released when the relay is supplied with energy periodically interrupted at said predetermined frequencies, and means responsive to and operative on picking up and releasing of the contacts of the track relay of the forward section at said substantially more rapid rates to interrupt said circuit controlled by said track relay contact.

3. In a coded railway signaling system, in combination, a stretch of railway track having a pair of track rails divided by insulated joints into a plurality of successive sections and including a forward and a rearward section, means governed by traffic conditions in advance of said forward section for selectively supplying to the rails of said forward section energy periodically interrupted at predetermined frequencies, each of said sections having a code following track relay receiving energy from the rails of such section, a circuit through which current may be supplied to the rails of the rearward section, said circuit including a contact of the track relay of the forward section and being complete only when said relay contact is in its released position, whereby if energy supplied over said circuit feeds to the winding of the track relay for the forward section said circuit becomes interrupted on picking up of the contacts of said relay with the result that the relay contacts become released to reestablish said circuit with resultant picking up and releasing of the track relay contacts at rates substantially more rapid than the rates at which said relay contacts are picked up and released when the relay is supplied with energy periodically interrupted at said predetermined frequencies, and means responsive to and operative on picking up and releasing of the contacts of the track relay of the forward section at said substantially more rapid rates to establish a circuit independent of the track relay contact for supplying energy to the rails of said rearward track section.

4. In a coded railway signaling system, in combination, a stretch of railway track having a pair of track rails divided by insulated joints into a plurality of successive sections and including a forward and a rearward section, means governed by traffic conditions in advance of the forward section for selectively supplying to the rails of said forward section energy periodically interrupted at predetermined frequencies, each of said sections having a code following track relay energized from the rails of such section, an auxiliary relay associated with the track relay for the forward section, means governed by code following operation of the contacts of said track relay for supplying energy to the winding of the auxiliary relay, said means being operative to effectively energize the auxiliary relay winding when and only when said track relay contacts are picked up and released substantially at the rates at which they are picked up and released when said track relay is supplied with energy periodically interrupted at said predetermined frequencies, whereby said auxiliary relay contacts are picked up when and only when the track relay is supplied with energy periodically interrupted substantially at said predetermined rates and are released when the forward section track relay is deenergized or is steadily energized or is energized with current periodically interrupted at rates substantially more rapid than said predetermined rates, and means controlled jointly by a contact of the forward section track relay and by a contact of the auxiliary relay for supplying energy to the rails of said rearward section, said means comprising a supply circuit complete when and only when the track relay contacts are released and the auxiliary relay contacts are picked up, whereby if energy supplied over said supply circuit feeds to the winding of the track relay for the forward section said supply circuit is interrupted on picking up of the track relay contacts so that the track relay contacts become released to reestablish the supply circuit with the result that as long as energy supplied to the rearward section through said supply circuit feeds to the forward section track relay the track relay contacts are picked up and released at said substantially more rapid rates and the contacts of the auxiliary relay become released to prevent continued supply of energy through said supply circuit.

5. In a coded railway signaling system, in combination, a stretch of railway track having a pair of track rails divided by insulated joints into a plurality of successive sections and including a forward and a rearward section, means governed by traffic conditions in advance of the forward section for selectively supplying to the rails of said forward section energy periodically interrupted at predetermined frequencies, each of said sections having a code following track relay energized from the rails of such section, an auxiliary relay associated with the track relay for the forward section, means governed by code following operation of the contacts of said track relay for supplying energy to the winding of the auxiliary relay, said means being operative to effectively energize the auxiliary relay winding when and only when said track relay contacts are picked up and released substantially at the rates at which they are picked up and released when said track relay is supplied with energy periodically interrupted at said predetermined frequencies, whereby said auxiliary relay contacts are picked up when and only when the forward section track relay is supplied with energy periodically interrupted substantially at said predetermined rates and are released when the track relay is deenergized or is steadily energized or is energized with current periodically interrupted at rates substantially more rapid than said predetermined rates, and means controlled jointly by the forward section track relay and by said auxiliary relay for supplying energy to the rails of the rearward section, said means comprising a first supply circuit complete only when the contacts of the forward section track relay are released and a second supply circuit complete only when the auxiliary relay contacts are released, whereby if energy supplied over said first supply circuit feeds to the track relay for the forward section said circuit is interrupted on picking up of the track relay contacts so that the relay contacts become released to reestablish said first supply circuit with the result that as long as energy supplied to the rearward section through said first supply circuit feeds to the track relay for the forward section the track relay contacts are picked up and released at said substantially more rapid rates and the contacts of the auxiliary relay become released to establish said second supply circuit.

6. In a coded railway signaling system, in combination, a stretch of railway track having a pair of track rails divided by insulated joints into a plurality of successive sections and including a forward and a rearward section, means governed by traffic conditions in advance of the forward section for selectively supplying to the rails of said forward section energy periodically interrupted at predetermined frequencies, each of said sections having a code following track relay energized from the rails of such section, an auxiliary relay associated with the track relay for the forward section, means governed by code following operation of the contacts of said track relay for supplying energy to the winding of the auxiliary relay, said means being operative to effectively energize the auxiliary relay winding when and only when said track relay contacts are picked up and released substantially at the rates at which they are picked up and released when said track relay is supplied with energy periodically interrupted at said predetermined frequencies, whereby said auxiliary relay contacts are picked up when and only when the forward section track relay is supplied with energy periodically interrupted substantially at said predetermined rates and are released when the track relay is deenergized or is steadily energized or is energized with current periodically interrupted at rates substantially more rapid than said predetermined rates, and means controlled jointly by the forward section track relay and by said auxiliary relay for supplying energy to the rails of the rearward section, said means comprising a first supply circuit complete when the contacts of the forward section track relay are released and the contacts of the auxiliary relay are picked up and a second supply circuit complete when the auxiliary relay contacts are released, whereby if energy supplied over said first supply circuit feeds to the track relay for the forward section said circuit is interrupted on picking up of the track relay contacts so that the relay contacts become released to reestablish said first supply circuit with the result that as long as energy supplied to the rearward section through said first supply circuit feeds to the forward section track relay the contacts of said relay are picked up and released at said substantially more rapid rates and the contacts of the auxiliary relay become released to interrupt the first supply circuit and to establish the second supply circuit.

7. In a coded railway signaling system, in combination, a stretch of railway track having a pair of track rails divided by insulated joints into a plurality of successive sections and including a forward and a rearward section, means governed by traffic conditions in advance of the forward section for selectively supplying to the rails of said forward section energy periodically interrupted at predetermined frequencies, each of said sections having a code following track relay energized from the rails of such section, an auxiliary relay associated with the track relay for the forward section, a transformer having a primary and a secondary winding, the forward section track relay contacts being operable when moved between their released and picked up positions to vary energization of the transformer primary winding, said track relay contacts being operable in their picked up position to establish one circuit to supply energy from the transformer secondary winding to the auxiliary relay winding and being operable in their released position to establish another circuit to supply energy from the transformer secondary winding to the auxiliary relay winding, one of the circuits for supplying energy to the auxiliary relay winding being controlled by a contact of the auxiliary relay and being complete only when said contact is picked up, and means controlled jointly by a contact of the forward section track relay and by a contact of the auxiliary relay for supplying energy to the rails of said rearward section.

8. In a coded railway signaling system, in combination, a stretch of railway track having a pair of track rails divided by insulated joints into a plurality of successive sections and including a forward and a rearward section, means governed by traffic conditions in advance of the forward section for selectively supplying to the rails of said forward section energy periodically interrupted at predetermined frequencies, each of said sections having a code following track relay energized from the rails of such section, an auxiliary relay associated with the track relay for the forward section, means operative on movement of the forward section track relay contacts to their picked up position to supply an impulse of energy to one circuit through which energy may be supplied to the auxiliary relay winding, said means being operative on movement of the track relay contacts to their released position to supply an impulse of energy to another circuit through which energy may be supplied to the auxiliary relay winding, one of the circuits for supplying energy to the winding of the auxiliary relay being controlled by a contact of the auxiliary relay and being complete only when said contact is picked up, and means controlled jointly by a contact of the forward section track relay and of said auxiliary relay for supplying energy to the rails of such rearward section.

9. In a coded railway signaling system, in combination, a stretch of railway track having a pair of track rails divided by insulated joints into a plurality of successive sections and including a forward and a rearward section, means governed by traffic conditions in advance of the forward section for selectively supplying to the rails of said forward section energy periodically interrupted at predetermined frequencies, each of said sections having a code following track relay energized from the rails of such section, a transformer having a primary and a secondary winding, means including a contact of the track relay for the forward section for varying energization of the transformer primary winding when the track relay contacts are picked up and released, an auxiliary relay responsive to the supply of unidirectional current, means for supplying energy from said transformer secondary winding to the auxiliary relay winding, means including a contact of the forward section track relay for rectifying the current supplied from said transformer secondary winding to said auxiliary winding, said rectifying means being ineffective if the track relay contacts are operated at rates substantially higher than those at which they are operated when the relay is supplied with energy periodically interrupted substantially at said predetermined frequencies, whereby said auxiliary relay contacts are released when said track relay contacts are operated at rates substantially higher than those at which they are operated when the track relay is supplied with energy periodically interrupted at said predetermined frequencies, and means controlled jointly by a contact of said forward section track relay and by a contact of said auxiliary relay for supplying energy to the rails of said rearward section, said last named means comprising a circuit complete when and only when the contacts of the forward section track relay are released and the contacts of the auxiliary relay are picked up, whereby if energy supplied over said circuit feeds to the forward section track relay said circuit is interrupted on picking up of the track relay contacts so that the track relay contacts become released to reestablish said circuit with the result that as long as energy supplied to the rearward section through said circuit feeds to the forward section track relay the track relay contacts are picked up and released at said substantially more rapid rates and the contacts of the auxiliary relay become released to prevent further supply of energy through said circuit.

10. In a coded railway signaling system, in combination, a stretch of railway track having a pair of track rails divided by insulated joints into a plurality of successive sections and including a forward and a rearward section, means governed by traffic conditions in advance of the forward section for selectively supplying to the rails of said forward section energy periodically interrupted at predetermined frequencies, each of said sections having a code following track relay energized from the rails of such section, a transformer having a primary and a secondary winding, means including a contact of the track relay for said forward section for varying energization of said transformer primary winding when said track relay contacts are picked up and released, an auxiliary relay having contacts which become picked up and released when and only when the relay winding is supplied with current predominantly of one relative polarity in excess of a predetermined value, means for supplying energy from said transformer secondary winding to said auxiliary relay winding, means including a contact of the forward section track relay for rectifying the energy supplied from the transformer secondary winding to the auxiliary relay winding, a condenser associated with the transformer secondary winding and arranged to absorb a portion of the current supplied by said secondary winding, the various parts of the equipment being arranged and proportioned so that when the forward section track relay contacts are operated substantially at the rates at which they are operated when the track relay is supplied with energy periodically interrupted at said predetermined frequencies the current remaining after the condenser is charged and the rectification of the secondary output being such that the auxiliary relay contacts are held picked up, the various parts of the equipment also being arranged and proportioned so that when the track relay contacts are operated at substantially higher rates the value of the current remaining after the condenser is charged and the degree of rectification being such that the auxiliary relay contacts become released, and means controlled jointly by a contact of the track relay and by a contact of the auxiliary relay for supplying energy to the rails of said rearward section, said last named means comprising a circuit complete only when the contacts of the forward section track relay are released, whereby if energy supplied over said circuit feeds to the forward section track relay said circuit is interrupted on picking up of the track relay contacts so that the track relay contacts become released to reestablish said circuit with the result that as long as energy supplied to the rearward section through said circuit feeds to the forward section track relay the contacts of said relay are picked up and released at said substantially more rapid rates and the contacts of said auxiliary relay become released.

11. In a coded railway signaling system, in combination, a stretch of railway track having a pair of track rails divided by insulated joints into a plurality of successive sections including adjoining forward and rearward sections, means governed by traffic conditions in advance of said forward section for selectively supplying to the rails of said forward section energy periodically interrupted at predetermined frequencies, each of said sections having a code following track relay having a winding receiving energy from the rails of such section, a supply circuit through which energy may be supplied to the rails of the rearward section, said supply circuit including a contact of the track relay for the forward section and being complete only when said relay contact is in its released position, whereby if energy supplied over said circuit feeds to the winding of the track relay for the forward section said circuit becomes interrupted on picking up of the contacts of said relay with the result that the relay contacts become released to reestablish said circuit with resultant picking up and releasing of the track relay contacts at rates substantially more rapid than the rates at which said relay contacts are picked up and released when the relay is supplied with energy periodically interrupted at said predetermined frequencies, a reactive transformer having a primary and a secondary winding, an auxiliary relay, and means governed by a contact of the track relay for the forward section for energizing the transformer primary winding, means governed by a contact of said forward section track relay for supplying current from the transformer secondary winding to the auxiliary relay winding, the equipment being selected and proportioned so that when the contacts of the track relay for the forward section are picked up and released at the rates at which they are picked up and released when said relay is normally supplied with energy periodically interrupted at said predetermined frequencies current which is predominantly of one relative polarity is supplied to the winding of the auxiliary relay to thereby maintain the auxiliary relay contacts picked up at such times and when the contacts of the forward section track relay are picked up and released at said substantially more rapid rates the current supplied to the auxiliary relay winding includes substantial components of both relative polarities to thereby cause release of the auxiliary relay contacts at such times, a contact of said auxiliary relay being included in said supply circuit and being operative when and only when picked up to permit said supply circuit to be established.

CHARLES B. SHIELDS.
HERMAN G. BLOSSER.